US008493958B2

(12) United States Patent
Attar et al.

(10) Patent No.: US 8,493,958 B2
(45) Date of Patent: Jul. 23, 2013

(54) FLEXIBLE PAYLOAD CONTROL IN DATA-OPTIMIZED COMMUNICATION SYSTEMS

(75) Inventors: Rashid Ahmed Akbar Attar, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 947 days.

(21) Appl. No.: 11/676,925

(22) Filed: Feb. 20, 2007

(65) Prior Publication Data
US 2007/0195747 A1 Aug. 23, 2007

Related U.S. Application Data

(60) Provisional application No. 60/775,443, filed on Feb. 21, 2006, provisional application No. 60/775,693, filed on Feb. 21, 2006.

(51) Int. Cl.
*H04J 3/24* (2006.01)
(52) U.S. Cl.
USPC ........... 370/349; 370/230; 370/241; 370/252; 370/312; 370/342; 455/518; 455/450; 455/452.2
(58) Field of Classification Search
USPC ................ 370/349, 342, 230, 241, 252, 312; 370/473, 474; 455/518, 450, 452.2
See application file for complete search history.

(56) References Cited

U.S. PATENT DOCUMENTS

| 6,078,572 | A | * | 6/2000 | Tanno et al. ................. 370/335 |
| 6,130,886 | A | | 10/2000 | Ketseoglou et al. |
| 6,694,469 | B1 | | 2/2004 | Jalali et al. |
| 6,717,924 | B2 | | 4/2004 | Ho et al. |
| 6,788,687 | B2 | | 9/2004 | Bao et al. |
| 6,822,952 | B2 | | 11/2004 | Abrol et al. |

(Continued)

FOREIGN PATENT DOCUMENTS

| EP | 0959634 A2 | 11/1999 |
| EP | 0995275 | 4/2000 |

(Continued)

OTHER PUBLICATIONS

International Search Report—PCT/US07/062455—International Search Authority—European Search Authority—Nov. 14, 2007.

(Continued)

*Primary Examiner* — Manpreet Matharu
(74) *Attorney, Agent, or Firm* — Kevin Cheatham

(57) ABSTRACT

An access terminal (AT) and a data-optimized cellular communication radio network (RN) negotiate a set of packet sizes for use on a reverse link between the AT and the RN. The negotiated set of packet sizes may differ from the default set of packet sizes defined in an existing standard, such as 1xEV-DO Revisions A and B. The packet sizes in the negotiated set may be tailored to provide a good fit with an application transmitting data on the reverse link, such as a voice encoder of a voice over Internet Protocol (VoIP) application. The AT and the RN communicate using the negotiated set of packet sizes. The packet sizes of the negotiated set may be mapped to the same reverse rate indicator (RRI) channel codewords as are defined in systems operating under the standard. Packing efficiency is thus increased, and higher capacity for delay-sensitive applications is achieved.

39 Claims, 2 Drawing Sheets

U.S. PATENT DOCUMENTS

| | | | |
|---|---|---|---|
| 6,882,632 B1 | 4/2005 | Koo et al. | |
| 6,912,214 B2 | 6/2005 | Madour et al. | |
| 6,963,534 B1 * | 11/2005 | Shorey et al. | 370/230 |
| 6,980,569 B1 * | 12/2005 | Beyda et al. | 370/516 |
| 6,987,780 B2 | 1/2006 | Wei et al. | |
| 7,002,900 B2 | 2/2006 | Walton et al. | |
| 7,042,869 B1 | 5/2006 | Bender | |
| 7,043,249 B1 | 5/2006 | Sayeedi | |
| 7,050,405 B2 | 5/2006 | Attar et al. | |
| 7,088,701 B1 | 8/2006 | Attar et al. | |
| 7,099,629 B1 | 8/2006 | Bender | |
| 7,127,654 B2 | 10/2006 | Jalali et al. | |
| 7,139,274 B2 | 11/2006 | Attar et al. | |
| 7,145,940 B2 | 12/2006 | Gore et al. | |
| 7,170,876 B2 | 1/2007 | Wei et al. | |
| 7,463,867 B2 | 12/2008 | Luo et al. | |
| 7,680,211 B1 | 3/2010 | Von der Embse | |
| 7,719,991 B2 | 5/2010 | Bhushan et al. | |
| 7,764,981 B2 | 7/2010 | Kalofonos et al. | |
| 8,077,595 B2 | 12/2011 | Bhushan et al. | |
| 2001/0009555 A1 * | 7/2001 | Diepstraten et al. | 370/468 |
| 2002/0002704 A1 | 1/2002 | Davis et al. | |
| 2002/0039355 A1 * | 4/2002 | Yun et al. | 370/318 |
| 2002/0145990 A1 | 10/2002 | Sayeedi | |
| 2002/0193112 A1 | 12/2002 | Aoki et al. | |
| 2003/0040315 A1 | 2/2003 | Khaleghi et al. | |
| 2003/0072254 A1 | 4/2003 | Ma et al. | |
| 2003/0153327 A1 | 8/2003 | Tajiri et al. | |
| 2003/0220103 A1 | 11/2003 | Kim et al. | |
| 2003/0235147 A1 | 12/2003 | Walton et al. | |
| 2004/0022203 A1 | 2/2004 | Michelson | |
| 2004/0063431 A1 | 4/2004 | Julka et al. | |
| 2004/0092276 A1 * | 5/2004 | Dooley | 455/504 |
| 2004/0095851 A1 | 5/2004 | Ellner et al. | |
| 2004/0141481 A1 | 7/2004 | Lee et al. | |
| 2004/0147223 A1 | 7/2004 | Cho | |
| 2004/0228267 A1 | 11/2004 | Agrawal et al. | |
| 2005/0014524 A1 * | 1/2005 | Lott et al. | 455/522 |
| 2005/0063298 A1 | 3/2005 | Ling et al. | |
| 2005/0073969 A1 | 4/2005 | Hart et al. | |
| 2005/0111397 A1 | 5/2005 | Attar et al. | |
| 2005/0111437 A1 * | 5/2005 | Maturi | 370/352 |
| 2005/0111599 A1 | 5/2005 | Walton et al. | |
| 2005/0135284 A1 | 6/2005 | Nanda et al. | |
| 2005/0135291 A1 | 6/2005 | Ketchum et al. | |
| 2005/0135318 A1 | 6/2005 | Walton et al. | |
| 2005/0135403 A1 | 6/2005 | Ketchum et al. | |
| 2005/0135416 A1 | 6/2005 | Ketchum et al. | |
| 2005/0141475 A1 | 6/2005 | Vijayan et al. | |
| 2005/0163262 A1 | 7/2005 | Gupta | |
| 2005/0195763 A1 | 9/2005 | Kadous et al. | |
| 2005/0249177 A1 | 11/2005 | Huo et al. | |
| 2005/0270969 A1 | 12/2005 | Han et al. | |
| 2005/0281290 A1 | 12/2005 | Khandekar et al. | |
| 2006/0013182 A1 | 1/2006 | Balasubramanian et al. | |
| 2006/0018397 A1 | 1/2006 | Sampath et al. | |
| 2006/0018411 A1 | 1/2006 | Gore et al. | |
| 2006/0023772 A1 | 2/2006 | Mudulodu et al. | |
| 2006/0078075 A1 | 4/2006 | Stamoulis et al. | |
| 2006/0088003 A1 | 4/2006 | Harris | |
| 2006/0133273 A1 | 6/2006 | Julian et al. | |
| 2006/0133521 A1 | 6/2006 | Sampath et al. | |
| 2006/0135080 A1 | 6/2006 | Khandekar et al. | |
| 2006/0136790 A1 | 6/2006 | Julian et al. | |
| 2006/0171295 A1 | 8/2006 | Ihm et al. | |
| 2006/0178153 A1 | 8/2006 | Tenny et al. | |
| 2006/0193338 A1 | 8/2006 | Zheng et al. | |
| 2006/0198344 A1 | 9/2006 | Teague et al. | |
| 2006/0203794 A1 | 9/2006 | Sampath et al. | |
| 2006/0203845 A1 | 9/2006 | Monogioudis | |
| 2006/0205413 A1 | 9/2006 | Teague | |
| 2006/0209732 A1 | 9/2006 | Gorokhov et al. | |
| 2006/0209927 A1 | 9/2006 | Khandekar et al. | |
| 2006/0217124 A1 | 9/2006 | Bi et al. | |
| 2006/0227887 A1 | 10/2006 | Li et al. | |
| 2006/0233124 A1 | 10/2006 | Palanki | |
| 2006/0233131 A1 | 10/2006 | Gore et al. | |
| 2006/0240784 A1 | 10/2006 | Naguib et al. | |
| 2006/0274712 A1 | 12/2006 | Malladi et al. | |
| 2006/0276212 A1 | 12/2006 | Sampath et al. | |
| 2006/0286974 A1 | 12/2006 | Gore et al. | |
| 2007/0010957 A1 | 1/2007 | Sampath et al. | |
| 2007/0011589 A1 | 1/2007 | Palanki | |
| 2007/0019535 A1 | 1/2007 | Sambhwani et al. | |
| 2007/0025325 A1 * | 2/2007 | Kumar | 370/350 |
| 2007/0025345 A1 * | 2/2007 | Bachl et al. | 370/389 |
| 2007/0030839 A1 | 2/2007 | Vimpari et al. | |
| 2007/0070942 A1 | 3/2007 | Harris et al. | |
| 2007/0071127 A1 | 3/2007 | Gore et al. | |
| 2007/0087749 A1 | 4/2007 | Ionescu et al. | |
| 2007/0195688 A1 | 8/2007 | Bhushan et al. | |
| 2007/0195723 A1 | 8/2007 | Attar et al. | |
| 2007/0195740 A1 | 8/2007 | Bhushan et al. | |
| 2007/0195899 A1 | 8/2007 | Bhushan et al. | |
| 2007/0195908 A1 | 8/2007 | Attar et al. | |
| 2007/0293172 A1 | 12/2007 | Shi et al. | |
| 2008/0151743 A1 | 6/2008 | Tong et al. | |
| 2009/0067405 A1 | 3/2009 | Zhang et al. | |
| 2009/0310702 A1 | 12/2009 | Lewis | |
| 2012/0014392 A1 | 1/2012 | Bhushan et al. | |
| 2012/0269052 A1 | 10/2012 | Chen et al. | |

FOREIGN PATENT DOCUMENTS

| | | |
|---|---|---|
| EP | 1367760 A2 | 12/2003 |
| EP | 1422851 A1 | 5/2004 |
| EP | 1489775 A1 | 12/2004 |
| EP | 1513304 | 3/2005 |
| EP | 1542488 A1 | 6/2005 |
| EP | 1565015 A2 | 8/2005 |
| EP | 1596525 A1 | 11/2005 |
| EP | 1608120 A2 | 12/2005 |
| EP | 1619847 A2 | 1/2006 |
| GB | 2394871 A | 5/2004 |
| JP | 2000270024 | 9/2000 |
| JP | 2002320260 A | 10/2002 |
| JP | 2002374562 A | 12/2002 |
| JP | 2002544733 | 12/2002 |
| JP | 2003533078 | 11/2003 |
| JP | 2004158901 A | 6/2004 |
| JP | 2005510904 A | 4/2005 |
| JP | 2005536967 T | 12/2005 |
| JP | 2006270968 A | 10/2006 |
| JP | 2009503912 A | 1/2009 |
| KR | 20040029416 | 4/2004 |
| KR | 2005120806 | 12/2005 |
| RU | 2238611 C1 | 10/2004 |
| RU | 2004117217 A | 3/2005 |
| WO | WO0069203 | 11/2000 |
| WO | WO0176110 A2 | 10/2001 |
| WO | WO0180477 | 10/2001 |
| WO | WO0219605 | 3/2002 |
| WO | WO03017688 A2 | 2/2003 |
| WO | WO03034644 A1 | 4/2003 |
| WO | WO03041298 | 5/2003 |
| WO | WO03096581 A1 | 11/2003 |
| WO | WO03096598 | 11/2003 |
| WO | WO2004004269 | 1/2004 |
| WO | WO2004038984 A2 | 5/2004 |
| WO | WO2004038988 | 5/2004 |
| WO | WO2004056142 | 7/2004 |
| WO | WO2004057894 A1 | 7/2004 |
| WO | WO2004084450 | 9/2004 |
| WO | WO2004095851 | 11/2004 |
| WO | WO2004098098 | 11/2004 |
| WO | 2004114549 | 12/2004 |
| WO | WO2004114548 A1 | 12/2004 |
| WO | WO2005015775 A1 | 2/2005 |
| WO | WO2005032001 A1 | 4/2005 |
| WO | WO2005048640 | 5/2005 |
| WO | WO2005071867 | 8/2005 |
| WO | WO2005088882 | 9/2005 |

| | | | |
|---|---|---|---|
| WO | WO2005125139 A1 | 12/2005 | |
| WO | 2006086497 A1 | 8/2006 | |

OTHER PUBLICATIONS

Fan, et al.; "On the Reverse Link Performance of Cdma2000 1Xev-Do Revision A System", IEEE Xplore Online, Feb. 2005, pp. 2244-2250,XP002438335,New York, USA.

Hermann Rohling et al., : "Performance Comparison of Different Multiple Access Schemes for the Downlink of an OFDM Communication System", Vehicular Technology Conference, 1997, 47th IEEE, vol. 3, May 3-7, 1997, pp. 1365-1369.

Ojanpera, T. et al.: "Frames—Hybrid Multiple Access Technology," IEEE International Symposium on Spread Spectrum Techniques and Applications, No. 1, Sep. 22, 1996, pp. 320-324.

Taiwanese Search report—096106482—TIPO—Jan. 24, 2011.

Written Opinion—PCT/US2007/062455, International Search Authority, European Patent Office, Nov. 14, 2007.

* cited by examiner

FLEXIBLE PAYLOAD CONTROL IN DATA-OPTIMIZED COMMUNICATION SYSTEMS

CLAIM OF PRIORITY UNDER 35 U.S.C. §119

The present Application for Patent claims priority to U.S. Provisional Patent Application Ser. No. 60/775,443, entitled "Wireless Communication System and Method," filed on Feb. 21, 2006; the present Application for Patent also claims priority to U.S. Provisional Patent Application Ser. No. 60/775,693, entitled "DO Communication System and Method," filed on Feb. 21, 2006. Each of these Provisional Patent Applications is assigned to the assignee of the present Application and is expressly incorporated by reference as if fully set forth herein, including all figures, tables, and claims.

BACKGROUND

1. Field

The present invention relates generally to telecommunications, and, more specifically, the invention relates to cellular communication systems.

2. Background

A modern communication system is expected to provide reliable data transmission for a variety of applications, such as voice and data applications. In a point-to-multipoint communications context, known communication systems are based on frequency division multiple access (FDMA), time division multiple access (TDMA), code division multiple access (CDMA), and perhaps other multiple access communication schemes.

A CDMA system may be designed to support one or more CDMA standards, such as (1) the "TIA/EIA-95 Mobile Station-Base Station Compatibility Standard for Dual-Mode Wideband Spread Spectrum Cellular System" (this standard with its enhanced revisions A and B may be referred to as the "IS-95 standard"), (2) the "TIA/EIA-98-C Recommended Minimum Standard for Dual-Mode Wideband Spread Spectrum Cellular Mobile Station" (the "IS-98 standard"), (3) the standard sponsored by a consortium named "3rd Generation Partnership Project" (3GPP) and embodied in a set of documents known as the "W-CDMA standard," (4) the standard sponsored by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "TIA/EIA/IS-856 cdma2000 High Rate Packet Data Air Interface Specification" (the "cdma2000 standard" collectively), (5) the 1xEV-DO standard, and (6) certain other standards. The standards expressly listed above are incorporated by reference as if fully set forth herein, including annexes, appendices, and other attachments.

Data-optimized or "DO" cellular communication systems have been developed to satisfy the constantly increasing demand for wireless data services. As the name implies, DO systems are optimized for data transmission (as opposed to voice transmission), and in particular such systems are optimized for downlink data transmission. Data-optimized systems need not exclude uplink data transmission, or voice transmission in either direction. It should be noted that voice may also be transmitted as data, for example, in the case of voice over internet protocol (VoIP) transmissions.

In cellular DO CDMA systems, reverse link data may be transmitted over the air interface using any one of a number of predefined packet sizes, for example, 128, 256, 512, 768, 1024, 1536, 2048, 3072, 4096, 6144, 8192, 12288 bit sizes. Generally, the sizes correspond to different rates, although the use of incremental redundancy with Hybrid Automatic Repeat-reQuest (HARQ) may affect the actual rates achieved in the field.

Some applications provide packets that do not fall neatly into one of the predefined sizes. For example, a vocoder (voice encoder) of a VoIP telephony application may provide periodic packets of 300 bits. According to one approach, such situations may be handled by choosing a smallest predefined packet size that is still larger than the packet size provided by the application. For a 300-bit application packet size, a 512-bit packet size may thus be selected on the reverse link of the air interface. The larger size packet is then used to transmit at least a portion of two or more packets provided by the vocoder (or another application). This approach leads to additional delay, because of the necessity to wait to assemble multiple vocoder packets into a single air interface packet. The additional delay may be excessive for the quality of service (QoS) of the application. To avoid the additional delay, another approach fits one user application packet into the larger size air interface packet, and stuffs the leftover bits in the larger size packet. This approach wastes the stuffed bits and thus causes a loss of spectral efficiency, increased interference, and decreased battery life.

Therefore, there is a need in the art for methods and apparatus that would improve packing efficiency and spectral efficiency on the reverse link. There is also a need in the art for methods and apparatus that would improve reverse link efficiencies for delay-sensitive applications. There is a further need in the art for methods and apparatus that would improve reverse link efficiencies for delay-sensitive applications while at the same time maintaining backward compatibility with legacy access terminals, and minimizing or eliminating hardware changes to the radio network.

SUMMARY

Embodiments disclosed herein address the above stated needs by providing methods, apparatus, and machine-readable articles of manufacture for implementing a negotiation of a set of allowable data traffic packet sizes for a reverse link.

In an embodiment, a method is provided for communicating data on a reverse link between a wireless access terminal and a radio network. The method includes the following steps: (1) determining one or more desired air interface packet sizes for the reverse link based on one or more parameters; (2) determining a desired set of air interface packet sizes for the reverse link, the desired set comprising each desired air interface packet size of said one or more desired air interface packet sizes; (3) transmitting to the radio network a request to use the desired set for data traffic on the reverse link; (4) in response to the step of transmitting to the radio network the request, receiving a negotiated set of air interface packet sizes to be used for the data traffic on the reverse link; and (5) communicating the data traffic on the reverse link using the negotiated set.

In an embodiment, a wireless access terminal for communicating with a base transceiver station of a radio network includes a receiver configured to receive forward link transmissions from the base transceiver station, and a transmitter configured to send reverse link transmissions to the base transceiver station, a memory storing program code, and a controller coupled to the receiver, transmitter, and the memory. The controller is configured to execute the program code to cause the wireless access terminal to perform these steps: (1) based on one or more parameters, determining one or more desired air interface packet sizes for the reverse link; (2) determining a desired set of air interface packet sizes for the reverse link, the desired set comprising each desired air interface packet size of said one or more desired air interface packet sizes; (3) transmitting to the radio network a request to use the desired set for data traffic on the reverse link; and (4) in response to the step of transmitting, receiving a negotiated set of air interface packet sizes to be used for the data traffic on the reverse link.

In an embodiment, a machine-readable medium has instructions embedded therein. When the instructions are executed by at least one processor of a wireless access terminal for communicating with a base transceiver station of a radio network, the instructions cause the wireless access terminal to perform the following operations: (1) determining, based on one or more parameters, one or more desired air interface packet sizes for a reverse link between the wireless access terminal and the radio network; (2) determining a desired set of air interface packet sizes for the reverse link, the desired set comprising each desired air interface packet size of said one or more desired air interface packet sizes; (3) transmitting to the radio network a request to use the desired set for data traffic on the reverse link; (4) in response to the step of transmitting, receiving a negotiated set of air interface packet sizes to be used for the data traffic on the reverse link; and (5) communicating the data traffic on the reverse link using the negotiated set.

In an embodiment, a method is provided for communicating data on a reverse link between a wireless access terminal and a radio network. The method includes these steps: (1) determining a desired set of air interface packet sizes for the reverse link, the desired set being different from a default set of air interface packet sizes of the radio network; (2) step for negotiating a negotiated set of air interface packet sizes to be used for data traffic on the reverse link; and (3) communicating the data traffic on the reverse link using the negotiated set.

In an embodiment, a method is provided for operating a data-optimized radio network. The radio network is configured to use a default set of packet sizes for data traffic on reverse links. The method includes (1) receiving from a wireless access terminal a desired set of packet sizes for data traffic on a reverse link between the radio network and the wireless access terminal, the desired set being different from the default set; (2) determining a negotiated set of packet sizes for data traffic on the reverse link, the step of determining being performed based at least in part on the desired set; (3) transmitting to the wireless access terminal the negotiated set; (4) receiving on the reverse link a plurality of data traffic packets; and (5) receiving from the wireless access terminal a plurality of indications of size of the data traffic packets. In accordance with this method, each indication of the plurality of indications is associated with a different data traffic packet of the plurality of data traffic packets, said each indication determines (corresponds to) the size of the data traffic packet associated with said each indication, said each indication is selected from the negotiated set, and at least one indication of the plurality of indications corresponds to a packet size not included in the default set.

In an embodiment, a method is provided for operating a data-optimized radio network configured to use a default set of packet sizes for data traffic on reverse links. The method includes (1) step for negotiating a negotiated set of packet sizes for data traffic on a reverse link between the radio network and a wireless access terminal; (2) transmitting to the wireless access terminal the negotiated set; (3) receiving on the reverse link a plurality of data traffic packets; and (4) receiving a plurality of indications of size of the data traffic packets. In accordance with this method, each indication of the plurality of indications is associated with a different data traffic packet of the plurality of data traffic packets, said each indication determines the size of the data traffic packet associated with said each indication, said each indication is selected from the negotiated set, and at least one indication of the plurality of indications corresponds to a packet size not included in the default set.

In an embodiment, a base transceiver station of a data-optimized radio network is provided. The radio network is configured to use a default set of packet sizes for data traffic on reverse links. The base transceiver station includes a receiver configured to receive data, a transmitter configured to transmit data, and a processor coupled to the receiver and to the transmitter. The processor is configured to cause the base transceiver station to perform the following steps: (1) receiving from a wireless access terminal a desired set of packet sizes for data traffic on a reverse link between the base transceiver station and the wireless access terminal, the desired set being different from the default set; (2) determining a negotiated set of packet sizes for the data traffic on the reverse link, the step of determining being performed based at least in part on the desired set; (3) transmitting to the wireless access terminal the negotiated set; (4) receiving on the reverse link a plurality of data traffic packets; and (5) receiving from the wireless access terminal a plurality of indications of size of the data traffic packets, each indication of the plurality of indications being associated with a different data traffic packet of the plurality of data traffic packets, said each indication determining the size of the data traffic packet associated with said each indication, said each indication being selected from the negotiated set, at least one indication of the plurality of indications corresponding to an entry in the negotiated set, the entry not being included in the default set.

In an embodiment, a machine-readable medium has instructions embedded therein. The instructions may be executed by at least one processor of a base transceiver station of a data-optimized radio network. The radio network is configured to use a default set of packet sizes for data traffic on reverse links. The instructions cause the base transceiver station to perform the following operations: (1) receiving from a wireless access terminal a desired set of packet sizes for data traffic on a reverse link between the base transceiver station and the wireless access terminal, the desired set being different from the default set; (2) determining a negotiated set of packet sizes for the data traffic on the reverse link, the step of determining being performed based at least in part on the desired set; (3) transmitting to the wireless access terminal the negotiated set; (4) receiving on the reverse link a plurality of data traffic packets; and (5) receiving from the wireless access terminal a plurality of indications of size of the data traffic packets, each indication of the plurality of indications being associated with a different data traffic packet of the plurality of data traffic packets, said each indication determining the size of the data traffic packet associated with said each indication, said each indication being selected from the negotiated set at least one indication of the plurality of indications corresponding to a packet size not included in the default set.

These and other embodiments and aspects of the present invention will be better understood with reference to the following description, drawings, and appended claims.

DETAILED DESCRIPTION

Figure 1:
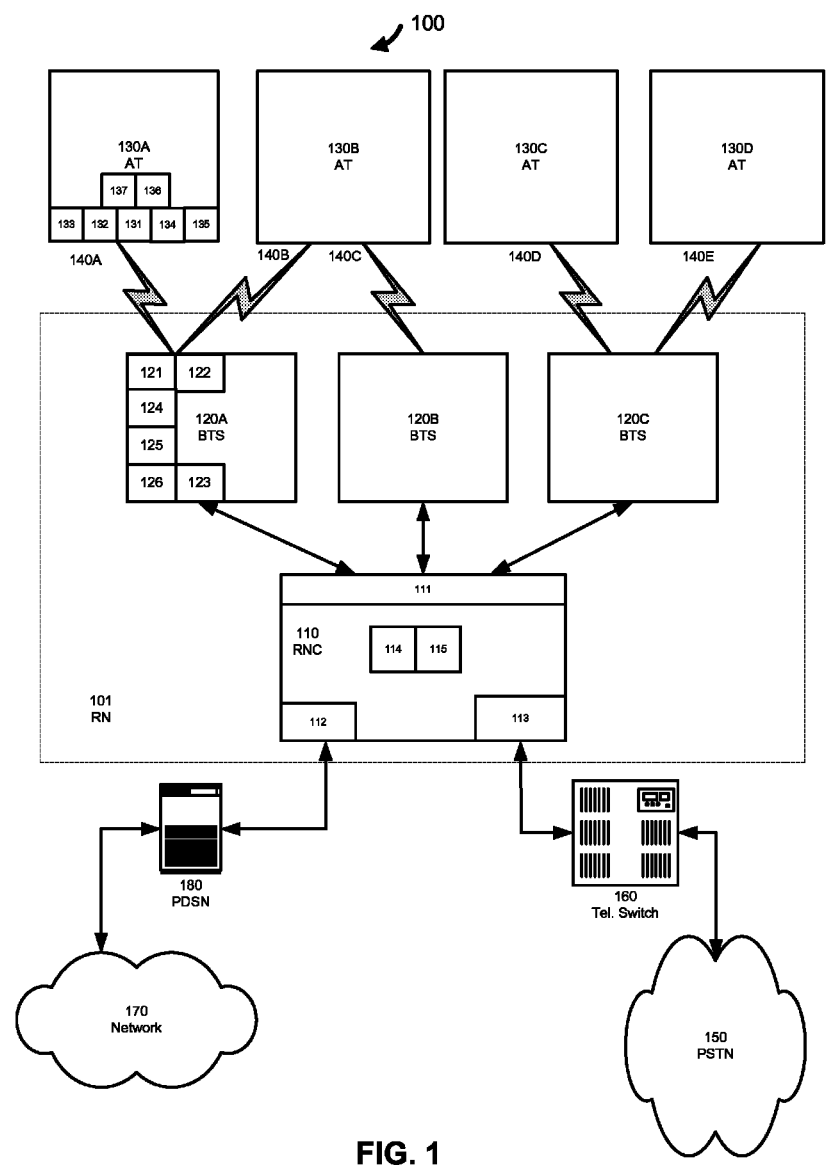
FIG. 1 illustrates selected components of a CDMA data-optimized cellular communication system configured in accordance with an embodiment of the present invention.

In this document, the words "embodiment," "variant," and similar expressions are used to refer to particular apparatus, process, or article of manufacture, and not necessarily to the same apparatus, process, or article of manufacture. Thus, "one embodiment" (or a similar expression) used in one place or context can refer to a particular apparatus, process, or article of manufacture; the same or a similar expression in a different place can refer to a different apparatus, process, or article of manufacture. The expression "alternative embodiment" and similar phrases are used to indicate one of a number of different possible embodiments. The number of possible embodiments is not necessarily limited to two or any other quantity.

The word "exemplary" is used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make or use the invention, and not to limit the scope of legal protection afforded the invention.

The word "traffic" generally refers to payload or user traffic, such as data other than air interface control information and pilots. For reverse link, data traffic is generally generated by an application, such a vocoder of a VoIP application.

An access terminal, also referred to as AT, subscriber station, user equipment, UE, mobile terminal, or MT, may be mobile or stationary, and may communicate with one or more base transceiver stations. An access terminal may be any of a number of types of devices, including but not limited to PC card, external or internal modem, wireless telephone, and personal digital assistant (PDA) with wireless communication capability. An access terminal transmits and receives data packets to or from a radio network controller through one or more base transceiver stations.

Base transceiver stations and base station controllers are parts of a network called radio network, RN, access network, and AN. A radio network may be a UTRAN or UMTS Terrestrial Radio Access Network. The radio network may transport data packets between multiple access terminals. The radio network may be further connected to additional networks outside the radio network, such as a corporate intranet, the Internet, a conventional public switched telephone network (PSTN), or another radio network, and may transport data and voice packets between each access terminal and such outside networks. Depending on conventions and on the specific implementations, a base transceiver station may be referred to by other names, including Node-B, base station system (BSS), and simply base station. Similarly, a base station controller may be referred to by other names, including radio network controller, RNC, controller, mobile switching center, or serving GPRS support node.

The scope of the invention extends to these and similar wireless communication system components.

FIG. 1 illustrates selected components of a communication network 100, which includes a radio network controller 110 coupled to wireless base transceiver stations 120A, 120B, and 120C. The base transceiver stations 120 communicate with access terminals 130A, 130B, 130C, and 130D through corresponding wireless connections 140A through 140E. Each of the wireless connections 140 represents both a forward link (from the BTS to the AT, also known as downlink) and a reverse link (from the AT to the BTS, also known as uplink). The radio network controller 110 is coupled to a public switched telephone network 150 through a telephone switch 160, and to a packet switched network 170 through a packet data server node (PDSN) 180. Data interchange between various network elements, such as the radio network controller 110 and the packet data server node 180, may be implemented using any number of protocols, for example, the Internet Protocol (IP), an asynchronous transfer mode (ATM) protocol, T1, E1, frame relay, and other protocols.

The radio network controller 110 and the base transceiver stations 120 are part of a data-optimized cellular CDMA radio network 101, for example, a 1xEV-DO radio network. In the illustrated embodiment, the radio network 101 provides both data communication services and cellular telephone services to the access terminals 130. In alternative embodiments, the radio network may provide only data services (including VoIP and similar packetized data-based voice communications).

Multiple or even all of the access terminals 130 may be in the same cell or site, or each access terminal 130 may be in a separate cell or site.

A typical access terminal, for example, the access terminal 130A, includes receiver circuitry 131, transmitter circuitry 132, encoder 133, decoder 134, equalizer 135, processor 136, and memory device 137. The receiver, transmitter, encoder, decoder, and equalizer are configured by the processor executing program code stored in the memory device. Each access terminal 130 is configured to communicate data using at least one transmission protocol, such as the wireless packet transmission protocols described in the standards mentioned above, including 1xEV-DO revisions A and B, with at least one of the access terminals 130 being further configured to negotiate a set of reverse link packet sizes in accordance with the variants described in this document. The access terminals 130 communicate with the base transceiver stations 120 via wireless connections 140A through 140E, as shown in FIG. 1.

Each of the base transceiver stations 120 includes one or more wireless receivers (e.g., receiver 121 of the BTS 120A), one or more wireless transmitters (e.g., transmitter 122 of the BTS 120A), radio network controller interface (e.g. interface 123), a memory (e.g., memory 124), a processor (e.g., processor 125), and encoder/decoder circuitry (e.g. encoder/decoder circuitry 126). A receiver/transmitter pair and other components of each base transceiver station are configured by the station's processor operating under control of the program code stored in the BTS's memory, to establish forward and reverse links with the access terminals 130 in order to send packets to and receive packets from the access terminals 130. In the case of data services, for example, the base transceiver stations 120 may receive forward link data packets from the packet switched network 170 through the packet data server node 180 and through the radio network controller 110, and transmit these packets to the access terminals 130. The base transceiver stations 120 may receive reverse link data packets that originate at the access terminals 130, and forward these packets to the packet switched network 170 through the radio network controller 110 and the packet data server node 180. In the case of telephone (voice) services, the base transceiver stations 120 may receive forward link data packets from the telephone network 150 through the telephone switch 160 and through the radio network controller 110, and transmit these packets to the access terminals 130. Voice packets originating at the access terminals 130 may be received at the base transceiver stations 120 and forwarded to the telephone network 150 via the radio network controller 110 and the telephone switch 160.

In some alternative embodiments, the transmitter, receiver, and other components of each BTS may each have separate processors.

The radio network controller 110 includes an interface 111 to the base transceiver stations 120, an interface 112 to the packet data server node 180, and an interface 113 to the telephone switch 160. The interfaces 111, 112, and 113 operate under control of one or more processors 114 executing program code stored in one or more memory devices 115.

The network 100 illustrated in FIG. 1 includes one public switched telephone network, one packet switched network, one base station controller, three base transceiver stations, and four access terminals. A person skilled in the art would recognize, after perusal of this document, that alternative embodiments in accordance with aspects of the invention need not be limited to any particular number of these components. For example, a lesser or a greater number of base transceiver stations, radio network controllers, and access terminals may be included in some embodiments. Furthermore, the communication network 100 may connect the access terminals 130 to one or more additional communication networks, for example, a second wireless communication network having a number of wireless access terminals.

In an embodiment, one or more of the access terminals 130 (e.g., the terminal 130A) communicate with a base transceiver station 120 of the radio network (e.g., the BTS 120A). The radio network and one or more of the access terminals are configured to define and negotiate a set of air interface packet sizes at the time of connection setup. At the same time, none, one, or several of the access terminals may operate in accordance with an existing (default, not negotiated) set of air interface packet sizes in accordance with one of the aforementioned standards. In some variants, the set of negotiated packet sizes has the same number of size entries as the number of default packet size entries under one of the applicable air interface standards mentioned above. For example, the number of packet sizes may be twelve or thirteen. In this way, each of the air interface packet sizes may be mapped to the existing codewords associated with packet sizes on the reverse rate indicator (RRI) channel of an existing air interface standard.

It should be noted that in some variants fewer or more codewords than in the standard may also be defined and negotiated in some variants. For example, three unused (in the standard) RRI codewords may be mapped to additional packet size entries in the negotiated set. Moreover, the mapping of the entries in the negotiated set need not be such that the same size is mapped onto the same codeword under an existing air interface standard and the negotiated set of size entries. Given an existing standard's sizes as listed above (128, 256, 512, 768, 1024, 1536, 2048, 3072, 4096, 6144, 8192, 12288), a new size of 300 bits may be used instead of 512, for example. The negotiated set may then be as follows: 128, 256, 300, 768, 1024, 1536, 2048, 3072, 4096, 6144, 8192, 12288. Given the sequence of RRI codewords in order of increasing packet sizes in the default (standard) set, the same sequence may be mapped in order to the increasing packet sizes in the negotiated set set. The new 300-bit size is then mapped to the RRI codeword used for the 512-bit size in the default set. This exemplary mapping is shown in Table 1 below, where $RRI_i$ represents an RRI codeword used to indicate a packet size, the corresponding packet size of the RRI codeword in the existing standard appears in the middle row (under $RRI_i$), and the corresponding packet size of the $RRI_i$ in the negotiated set appears in the bottom row (also in the same column as $RRI_i$). Thus, the middle row represents the default set, and the bottom row represents the negotiated set. Same convention applies to the other tables showing codeword mappings.

TABLE 1

| | CODEWORD | | | | | | | | | | | |
|---|---|---|---|---|---|---|---|---|---|---|---|---|
| | $RRI_1$ | $RRI_2$ | $RRI_3$ | $RRI_4$ | $RRI_5$ | $RRI_6$ | $RRI_7$ | $RRI_8$ | $RRI_9$ | $RRI_{10}$ | $RRI_{11}$ | $RRI_{12}$ |
| STANDARD PACKET SIZE | 128 | 256 | 512 | 768 | 1024 | 1536 | 2048 | 3072 | 4096 | 6144 | 8192 | 12288 |
| NEGOTIATED PACKET SIZE | 128 | 256 | 300 | 768 | 1024 | 1536 | 2048 | 3072 | 4096 | 6144 | 8192 | 12288 |

In the example shown in Table 1, some granularity was lost near the newly-added 300-bit size, because the 512-bit default size has been replaced by the 300-bit size in the negotiated set. The packet size selection choice now jumps from 300 bits to 768 bits, a ratio of more than two and one-half.

In accordance with another approach, the negotiated set may be as follows: 128, 256, 300, 512, 768, 1024, 1536, 2048, 3072, 4096, 6144, 8192. Here, the 300-bit size was added between the 256- and 512-bit default sizes, displacing the 12288-bit default size. This approach may be advantageous because an application requesting a 300-bit air interface packet size is more likely not to need a 12288-bit size than a 512-bit size, or any of the other packet sizes. The RRI codewords used for the 128- and 256-bit sizes may be the same, respectively, as the RRI codewords for the default 128- and 256-bit sizes in existing standards/systems, and the RRI codewords used for the default 512, 768, 1024, 1536, 2048, 3072, 4096, 6144, 8192, 12288 bit sizes may be mapped, in order, to RRI codewords used for the 300, 512, 768, 1024, 1536, 2048, 3072, 4096, 6144, 8192 bit packet sizes of the negotiated set. This exemplary mapping is shown in Table 2 below.

TABLE 2

| | CODEWORD | | | | | | | | | | | |
|---|---|---|---|---|---|---|---|---|---|---|---|---|
| | $RRI_1$ | $RRI_2$ | $RRI_3$ | $RRI_4$ | $RRI_5$ | $RRI_6$ | $RRI_7$ | $RRI_8$ | $RRI_9$ | $RRI_{10}$ | $RRI_{11}$ | $RRI_{12}$ |
| STANDARD PACKET SIZE | 128 | 256 | 512 | 768 | 1024 | 1536 | 2048 | 3072 | 4096 | 6144 | 8192 | 12288 |
| NEGOTIATED PACKET SIZE | 128 | 256 | 300 | 512 | 768 | 1024 | 1536 | 2048 | 3072 | 4096 | 6144 | 8192 |

In some variants the negotiated set substitutes a newly-defined packet size for the size most distant from the newly-defined packet size. Most distant in this context may be, for example, measured linearly (largest difference in the number of bits between the newly-defined size and the removed packet size), or logarithmically/geometrically (largest ratio in dBs between the two sizes).

In some variants, the RRI codewords used for the packet sizes of the negotiated set are mapped to the codewords corresponding to the same sizes within the default set of the existing standard, to the extent possible. When replacing the 12288-bit size with a 300-bit size, for example, the RRI codeword correspondence may be as in Table 3 below:

TABLE 3

| | CODEWORD | | | | | | | | | | | |
|---|---|---|---|---|---|---|---|---|---|---|---|---|
| | $RRI_1$ | $RRI_2$ | $RRI_3$ | $RRI_4$ | $RRI_5$ | $RRI_6$ | $RRI_7$ | $RRI_8$ | $RRI_9$ | $RRI_{10}$ | $RRI_{11}$ | $RRI_{12}$ |
| STANDARD PACKET SIZE | 128 | 256 | 512 | 768 | 1024 | 1536 | 2048 | 3072 | 4096 | 6144 | 8192 | 12288 |
| NEGOTIATED PACKET SIZE | 128 | 256 | 512 | 768 | 1024 | 1536 | 2048 | 3072 | 4096 | 6144 | 8192 | 300 |

The advantage of this approach is that RRI mapping changes for only the number of the new packet sizes defined in the negotiated set of RL packet sizes. The example of table 3 also illustrates removal of the packet size most distant to the newly-added packet size.

The set of packet sizes negotiated by the base transceiver station 120 and the access terminal 130 may substitute multiple or even all of the packet sizes in the default set of an existing standard. Thus, multiple closely-spaced, non-standard packet sizes may be present in the negotiated set. For example, an interval between adjacent packet sizes in the default set may be broken up into sub-intervals by two or more newly-defined packet sizes of the negotiated set. The interval may be broken up into equal or substantially equal (equal to the extent possible) sub-intervals. Table 4 below provides an example of such variant, where an interval between 768 bits and 1024 bits is broken into three substantially equal sub-intervals of 85 bits, 86 bits, and 85 bits.

TABLE 4

| | CODEWORD | | | | | | | | | | | |
|---|---|---|---|---|---|---|---|---|---|---|---|---|
| | $RRI_1$ | $RRI_2$ | $RRI_3$ | $RRI_4$ | $RRI_5$ | $RRI_6$ | $RRI_7$ | $RRI_8$ | $RRI_9$ | $RRI_{10}$ | $RRI_{11}$ | $RRI_{12}$ |
| STANDARD PACKET SIZE | 128 | 256 | 512 | 768 | 1024 | 1536 | 2048 | 3072 | 4096 | 6144 | 8192 | 12288 |
| NEGOTIATED PACKET SIZE | 128 | 256 | 512 | 768 | 853 | 939 | 1024 | 1536 | 2048 | 3072 | 4096 | 6144 |

The interval between non-adjacent packet sizes of an existing standard system may also be similarly broken into sub-intervals. The subintervals may be equal or substantially equal, or spaced in a geometric proportion. Table 5 below illustrates a variant with equal sub-intervals between 3072 and 6144 packet sizes.

TABLE 5

| | CODEWORD | | | | | | | | | | | |
|---|---|---|---|---|---|---|---|---|---|---|---|---|
| | $RRI_1$ | $RRI_2$ | $RRI_3$ | $RRI_4$ | $RRI_5$ | $RRI_6$ | $RRI_7$ | $RRI_8$ | $RRI_9$ | $RRI_{10}$ | $RRI_{11}$ | $RRI_{12}$ |
| STANDARD PACKET SIZE | 128 | 256 | 512 | 768 | 1024 | 1536 | 2048 | 3072 | 4096 | 6144 | 8192 | 12288 |
| NEGOTIATED PACKET SIZE | 512 | 768 | 1024 | 1536 | 2048 | 3072 | 3840 | 4608 | 5376 | 6144 | 8192 | 12288 |

The variants described above are exemplary. The negotiated set may have other packet size values. Indeed, all of the packet sizes may be negotiated and become different from the default packet size values used under an existing standard. Generally, the existing RRI codewords may be assigned to the packet sizes in the negotiated set in any manner whatsoever, and the invention does not exclude using a fewer or a greater number of RRI codewords than the number of RRI codewords in the existing standard system. Some access terminals may communicate with the radio network after negotiating a set of packet sizes, while other access terminals may concurrently use the default packet size set of the existing standard. In this way, one or more legacy access terminals may be served at the same time as one or more access terminals configured to negotiate the set of allowable reverse link packet sizes.

Turbo codes (e.g., $R=\frac{1}{5}$) may be used in the radio network. The packet sizes that are not exact powers of 2 may use a turbo interleaver parameter based on the next larger packet size that is a power of 2. A channel interleaver for smallest default payload larger than the payload to be transmitted may be employed, with a look-up table used to determine the exact packet sizes. If total transmit power to pilot power ratio (T2P) values are defined for the default packet sizes of the existing standard system, the T2P for the new (negotiated) payload packet sizes may be generated by linearly interpolating T2P values of the default payload packet sizes.

Figure 2:
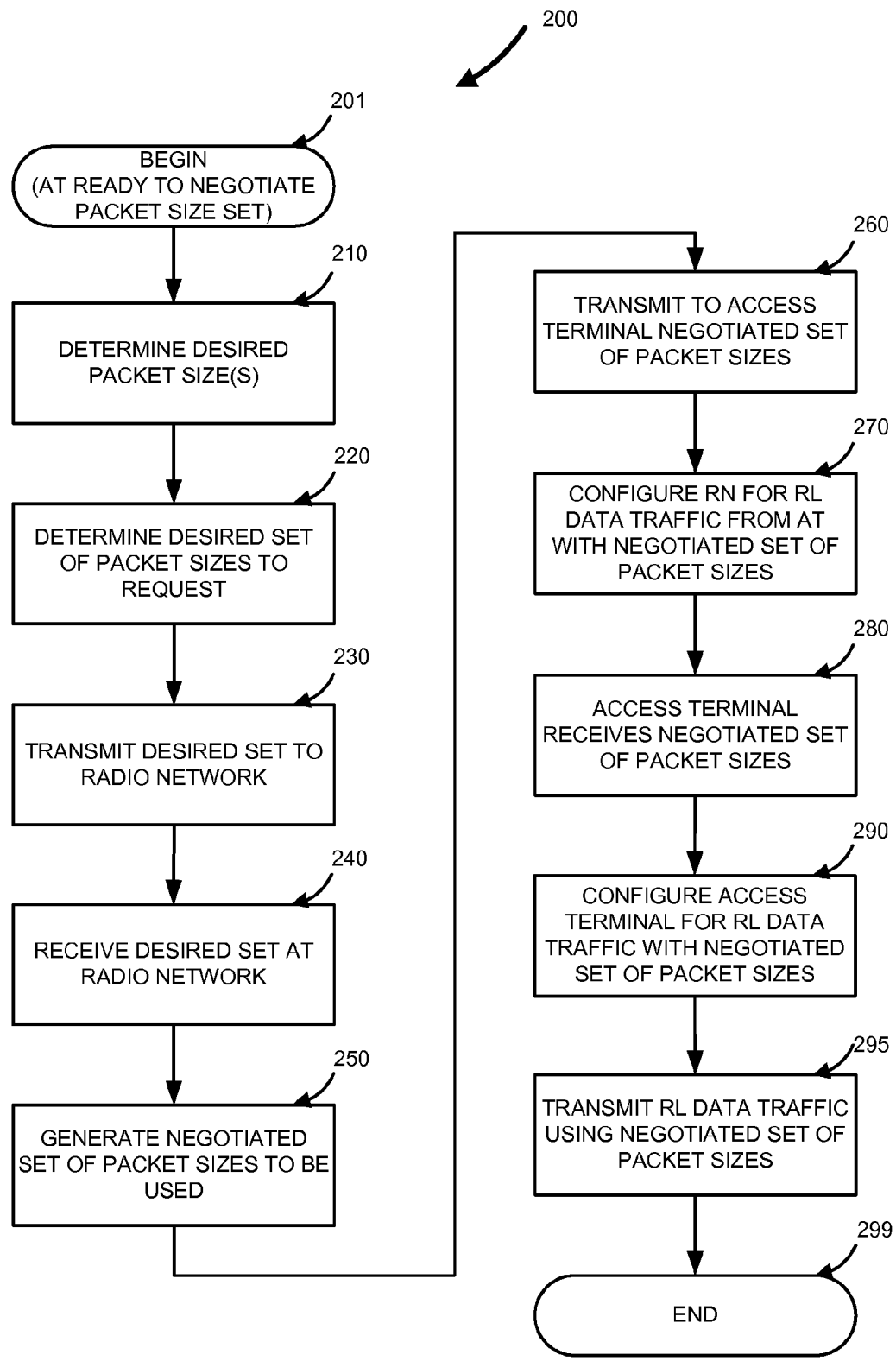
FIG. 2 illustrates selected steps of a process for negotiating a set of allowable packet sizes on a reverse link of the system, in accordance with an embodiment of the present invention.

FIG. 2 illustrates an exemplary process 200 performed in the course of negotiating a set of packet sizes for the reverse link between the access terminal and the radio network. The steps may be performed by an access terminal (e.g., the AT 130A) and a base transceiver station (e.g., the BTS 120A).

At flow point 201, the access terminal is ready to begin the process.

At step 210, one or more desired values for packet sizes of the reverse link are determined. In a variant, the access terminal receives the packet size value(s) from one or more user applications executing on the access terminal. For example, a vocoder of a VoIP telephony application may provide one or more packet sizes. The application(s) may have the value(s) stored, or determine the packet size value(s) dynamically, in response to current need, current configuration, and/or current QoS.

At step 220, the access terminal determines a complete set of packet sizes to request from the radio network. For example, the access terminal may replace one or more default values of the existing standard with one or more values received from the application(s) as illustrated in the Tables and accompanying explanations above.

At step 230, the access terminal transmits to the radio network (e.g., to the BTS) a request to use the desired set on the reverse link. This may be done by using a previously unassigned codeword on one of the reverse link control channels.

At step 240, the radio network receives from the access terminal the desired set of packet size values.

At step 250, the radio network uses predefined criteria to generate its own set of packet size values, based on the set of the desired values received from the access terminal. For example, the radio network may accept the values received from the access terminal. As another example, the radio network may substitute one or more different non-default or default values for the non-default values desired by the access terminal, based on some parameter(s), such as quality of service assigned to the application or the access terminal. In some variants, the radio network may also determine that the default set should be used notwithstanding the access terminal's preference. In some variants, the radio network also maps the RRI codewords to the packet sizes, or changes the mapping of the RRI codewords to the packet sizes from that requested by the access terminal (if the access terminal requested a specific mapping in the step 230).

At step 260, the radio network transmits to the access terminal the set of packet size values to be used on the reverse link. If the RRI mapping order has not been predefined, it may also be communicated to the access terminal. A downlink control channel may be used for this purpose.

At step 270, the radio network configures itself for receiving reverse link data from the access terminal using the set of packet size values/mappings to be used (instead of the default set). The set transmitted from the radio network thus becomes the negotiated set. Note that if the radio network accepted the values received from the access terminal, the negotiated set is identical to the desired set.

At step 280, the access terminal receives from the radio network the set of packet size values/mappings to be used.

At step 290, the access terminal configures itself for transmitting reverse link data using the negotiated set of packet size values/mappings (instead of the default set).

At step 295, the access terminal transmits reverse link data to the radio network using the negotiated set of packet size values/mappings. The transmitted packets may have one or more sizes that are not included in the default set of packet sizes. The process then terminates at flow point 299.

As illustrated in FIG. 2, the set of packet size values is negotiated with a single request from the access terminal and a single response from the access network. In some variants, however, multiple requests and responses may be used when the access network does not immediately accept the set desired by the access terminal. For example, the steps 220-260 may be repeated two or more times to arrive at a negotiated set of reverse link packet sizes, with the determination in the step 220 in second and later iterations being affected by the response of the radio network to the previously transmitted desired set.

RRI codeword mappings may also be negotiated in some variants, or the mappings may be predefined, for example, using a predetermined RRI codeword sequence in an ascending or descending packet size order.

Although steps and decisions of various methods may have been described serially in this disclosure, some of these steps and decisions may be performed by separate elements in conjunction or in parallel, asynchronously or synchronously, in a pipelined manner, or otherwise. There is no particular requirement that the steps and decisions be performed in the same order in which this description lists them, except where explicitly so indicated, otherwise made clear from the context, or inherently required. It should be noted, however, that in selected variants the steps and decisions are performed in the order described above. Furthermore, not every illustrated step and decision may be required in every embodiment/variant in accordance with the invention, while some steps and decisions that have not been specifically illustrated may be desirable or necessary in some embodiments/variants in accordance with the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To show clearly this interchangeability of hardware and software, various illustrative components, blocks, modules, circuits, and steps have been described above generally in terms of their functionality. Whether such functionality is implemented as hardware, software, or combination of hardware and software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an access terminal. Alternatively, the processor and the storage medium may reside as discrete components in an access terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

The invention claimed is:

1. A method of communicating data on a reverse link between a wireless access terminal and a radio network in which packet sizes on the reverse link are typically selected from a default set of standard air interface packet sizes, the method comprising:
    determining one or more non-standard air interface packet sizes for the reverse link to at least substantially match a size of an application packet utilized by an application on the wireless access terminal, the one or more non-standard air interface packet sizes differing from the standard air interface packet sizes in the default set;
    determining a desired set of air interface packet sizes for the reverse link, the desired set of air interface packet sizes including the one or more non-standard air interface packet sizes;
    transmitting from a wireless access terminal to a radio network a request to use the desired set of air interface packet sizes for data traffic on the reverse link;
    in response to the step of transmitting the request, receiving at the access terminal from the radio network a negotiated set of air interface packet sizes to be used for the data traffic on the reverse link, wherein the negotiated set of air interface packet sizes is based at least in part on the desired set of air interface packet sizes and includes at least one non-standard air interface packet size adapted to more closely match an application packet size as compared to the standard air interface packet sizes of the default set and thereby reduce or eliminate padding of transmitted air interface packets; and
    communicating the data traffic on the reverse link using the negotiated set.

2. The method of claim 1, wherein:
    the step of communicating comprises sending from the wireless access terminal to the radio network a plurality of reverse link traffic packets and an indication of packet size associated with each reverse link traffic packet of the plurality of reverse link traffic packets, the indication being selected from the negotiated set, wherein the indication associated with at least one reverse link traffic packet of the plurality of reverse link traffic packets corresponds to the at least one non-standard air interface packet size.

3. The method of claim 2, wherein determining one or more non-standard air interface packet sizes for the reverse link to at least substantially match a size of an application packet utilized by an application on the wireless access terminal comprises:
    ascertaining the application packet size to be substantially different from the standard air interface packet sizes of the default set; and
    determining a non-standard air interface packet size for the reverse link that at least substantially matches the application packet size to thereby reduce or eliminate padding of transmitted air interface packets and to avoid packet segmentation.

4. The method of claim 3, wherein a number of entries in the desired set is equal to a number of entries in the default set.

5. The method of claim 4, wherein a number of entries in the negotiated set is equal to the number of entries in the default set.

6. The method of claim 3, wherein the negotiated set is identical to the determined set.

7. The method of claim 3, wherein the negotiated set is different from the default set.

8. The method of claim 7, wherein the radio network services at least one access terminal using the default set.

9. The method of claim 3, wherein the application comprises a voice over Internet Protocol (VoIP) application, and the application packet size comprises voice encoder packet size of the VoIP application.

10. The method of claim 2, wherein the indication is transmitted as a codeword on a reverse rate indicator (RRI) channel.

11. A wireless access terminal for communicating with a base transceiver station of a radio network in which packet sizes on the reverse link are typically selected from a default set of standard air interface packet sizes, the wireless access terminal comprising:
a receiver configured to receive forward link transmissions from the base transceiver station;
a transmitter configured to send reverse link transmissions to the base transceiver station;
a memory storing program code; and
a controller coupled to the receiver, transmitter, and the memory, wherein the controller is configured to execute the program code to cause the wireless access terminal to perform steps comprising:
determining one or more non-standard air interface packet sizes for the reverse link to at least substantially match a size of an application packet utilized by an application on the wireless access terminal, the one or more non-standard air interface packet sizes differing from the standard air interface packet sizes of the default set;
determining a desired set of air interface packet sizes for the reverse link, the desired set of air interface packet sizes including the one or more non-standard air interface packet sizes;
transmitting to the base transceiver station a request to use the desired set of air interface packet sizes for data traffic on the reverse link; and
in response to the step of transmitting, receiving a negotiated set of air interface packet sizes to be used for the data traffic on the reverse link, wherein the negotiated set of air interface packet sizes is based at least in part on the desired set of air interface packet sizes and includes at least one non-standard air interface packet size adapted to more closely match an application packet size as compared to the standard air interface packet sizes of the default set and thereby reduce or eliminate padding of transmitted air interface packets.

12. The wireless access terminal of claim 11, wherein the controller is further configured to execute the program code to cause the wireless access terminal to send to the radio network a plurality of reverse link traffic packets and a plurality of indications of size of the reverse link traffic packets, each indication of the plurality of indications being associated with a different reverse link traffic packet of the plurality of reverse link traffic packets, said each indication determining the size of the reverse link traffic packet associated with said each indication, said each indication being selected from the negotiated set.

13. The wireless access terminal of claim 12, wherein the one or more non-standard air interface packet sizes for the reverse link are determined by:
ascertaining the application packet size to be substantially different from the standard air interface packet sizes of the default set; and
determining a non-standard air interface packet size for the reverse link that at least substantially matches the application packet size to thereby reduce or eliminate padding of transmitted air interface packets and to avoid packet segmentation.

14. The wireless access terminal of claim 13, wherein a number of entries in the determined set is equal to a number of entries in the default set and at least one indication of the plurality of indications corresponds to the at least one non-standard air interface packet size in the negotiated set.

15. The wireless access terminal of claim 14, wherein the number of entries in the negotiated set is equal to number of entries in the default set.

16. The wireless access terminal of claim 13, wherein the negotiated set is identical to the desired set.

17. The wireless access terminal of claim 13, wherein the negotiated set is different from the desired set of reverse link traffic packet sizes.

18. The wireless access terminal of claim 13, wherein the application comprises a voice over Internet Protocol (VoIP) application, and the application packet size comprises a voice encoder packet size of the VoIP application.

19. The wireless access terminal of claim 13, wherein the controller is further configured to execute the program code to cause the wireless access terminal to send the indications as codewords on a reverse rate indicator (RRI) channel.

20. A non-transitory machine-readable medium comprising instructions, the instructions, when executed by at least one processor of a wireless access terminal for communicating with a base transceiver station of a radio network in which packet sizes on the reverse link are typically selected from a default set of standard air interface packet sizes, cause the wireless access terminal to perform operations comprising:
determining one or more non-standard air interface packet sizes for a reverse link to at least substantially match a size of an application packet utilized by an application on the wireless access terminal, the one or more non-standard air interface packet sizes differing from the standard air interface packet sizes of the default set;
determining a desired set of air interface packet sizes for the reverse link, the desired set of air interface packet sizes including the one or more non-standard air interface packet sizes;
transmitting to the radio network a request to use the desired set of air interface packet sizes for data traffic on the reverse link;
in response to the step of transmitting to the radio network the request, receiving a negotiated set of air interface packet sizes to be used for the data traffic on the reverse link, wherein the negotiated set of air interface packet sizes is based at least in part on the desired set of air interface packet sizes and includes at least one non-standard air interface packet size adapted to more closely match an application packet size as compared to the standard air interface packet sizes of the default set to thereby reduce or eliminate padding of transmitted air interface packets; and communicating the data traffic on the reverse link using the negotiated set.

21. The machine-readable medium of claim 20, wherein:
the step of communicating comprises sending from the wireless access terminal to the radio network a plurality of reverse link traffic packets and a plurality of indications of size of the reverse link traffic packets, each indication of the plurality of indications being associated with a different reverse link traffic packet of the plurality of reverse link traffic packets, said each indication determining the size of the reverse link traffic packet associated with said each indication, said each indication being selected from the negotiated set, at least one indication of the plurality of indications corresponding to the at least one non-standard air interface packet size.

22. The machine-readable medium of claim 21, wherein said one or more non-standard air interface packet sizes are determined by:
ascertaining the application packet size to be substantially different from the standard air interface packet sizes of the default set; and
determining a non-standard air interface packet size for the reverse link that at least substantially matches the application packet size to thereby reduce or eliminate padding of transmitted air interface packets and to avoid packet segmentation.

23. The machine-readable medium of claim 22, wherein the application comprises a voice over Internet Protocol (VoIP) application, and the application packet size comprises a voice encoder packet size of the VoIP application.

24. The machine-readable medium of claim 22, wherein said each indication is transmitted as a codeword on a reverse rate indicator (RRI) channel.

25. A method of communicating data on a reverse link between a wireless access terminal and a radio network in which packet sizes on the reverse link are typically selected from a default set of standard air interface packet sizes, the method comprising:
determining a desired set of air interface packet sizes for the reverse link, the desired set being different from the default set of air interface packet sizes of the radio network, wherein the desired set includes at least one non-standard air interface packet size selected to at least substantially match a size of an application packet utilized by an application on the wireless access terminal;
negotiating between a wireless access terminal and a radio network a negotiated set of air interface packet sizes to be used for data traffic on the reverse link, the negotiated set of air interface packet sizes based at least in part on the desired set of air interface packet sizes and including at least one non-standard air interface packet size, wherein the at least one non-standard air interface packet size differs from the standard air interface packet sizes in the default set and is adapted to more closely match an application packet size as compared to the standard air interface packet sizes of the default set to thereby reduce or eliminate padding of transmitted air interface packets; and
communicating the data traffic on the reverse link from the wireless access terminal to the radio network using the negotiated set.

26. A method of operating a data-optimized radio network, the radio network being configured to use a default set of packet sizes for data traffic on reverse links, the method comprising:
receiving from a first wireless access terminal a desired set of packet sizes for data traffic on a first reverse link between the radio network and the first wireless access terminal, the desired set being different from the default set and including at least one non-standard air interface packet size selected by the first wireless access terminal to at least substantially match an application packet size utilized by an application of the first wireless access terminal and thereby reduce or eliminate padding of transmitted air interface packets from the first wireless access terminal;
determining a negotiated set of packet sizes for data traffic on the first reverse link, the step of determining being performed based at least in part on the desired set;
transmitting to the first wireless access terminal the negotiated set;
receiving on the first reverse link a plurality of first data traffic packets; and
receiving from the first wireless access terminal a plurality of first indications of size of the first data traffic packets, each first indication of the plurality of first indications being associated with a different first data traffic packet of the plurality of first data traffic packets, said each first indication determining the size of the first data traffic packet associated with said each first indication, said each first indication being selected from the negotiated set, at least one first indication of the plurality of first indications corresponding to a packet size not included in the default set.

27. The method of claim 26, further comprising:
decoding said each first data traffic packet in accordance with the first indication associated with said each first data traffic packet.

28. The method of claim 27, wherein the negotiated set is different from the default set.

29. The method of claim 27, wherein the step of receiving the plurality of indications comprises receiving said each indication as a codeword on a reverse rate indicator (RRI) channel.

30. The method of claim 27, further comprising:
receiving on a second reverse link a plurality of second data traffic packets from a second wireless access terminal; and
receiving from the second wireless access terminal a plurality of second indications of size of the second data traffic packets, each second indication of the plurality of second indications being associated with a different second data traffic packet of the plurality of second data traffic packets, said each second indication determining the size of the second data traffic packet associated with said each second indication, said each second indication being selected from the default set.

31. A method of operating a data-optimized radio network configured to use a default set of packet sizes for data traffic on reverse links, the method comprising:
receiving from a wireless access terminal a requested set of packet sizes for data traffic on a reverse link between the radio network and the wireless access terminal, the requested set being different from the default set and including at least one non-standard air interface packet size selected by the wireless access terminal to at least substantially match an application packet size utilized by an application on the wireless access terminal and thereby reduce or eliminate padding of transmitted air interface packets from the wireless access terminal;
negotiating a negotiated set of packet sizes for data traffic on the reverse link between the radio network and the wireless access terminal;

transmitting to the wireless access terminal the negotiated set;

receiving on the reverse link a plurality of data traffic packets; and receiving from the wireless access terminal an indicator associated with each data traffic packet of the plurality of data traffic packets for indicating a packet size of the associated data traffic packet, the indicator associated with each data traffic packet being selected from the negotiated set, wherein the indicator that is associated with at least one data traffic packet of the plurality of data traffic packets corresponds to a packet size not included in the default set.

32. A base transceiver station of a data-optimized radio network, the radio network being configured to use a default set of packet sizes for data traffic on reverse links, the base transceiver station comprising:

a receiver configured to receive data;

a transmitter configured to transmit data; and a processor coupled to the receiver and to the transmitter, wherein the processor is configured to cause the base transceiver station to perform steps comprising:

receiving from a first wireless access terminal a requested set of packet sizes for data traffic on a first reverse link between the base transceiver station and the first wireless access terminal, the requested set being different from the default set and including at least one non-standard air interface packet size selected by the first wireless access terminal to at least substantially match an application packet size utilized by an application of the first wireless access terminal and thereby reduce or eliminate padding of transmitted air interface packets from the first wireless access terminal;

determining a negotiated set of packet sizes for the data traffic on the first reverse link, the step of determining being performed based at least in part on the requested set;

transmitting to the first wireless access terminal the negotiated set;

receiving on the first reverse link a plurality of first data traffic packets; and receiving from the first wireless access terminal a plurality of first indicators, each first indicator of the plurality of first indicators being associated with a different first data traffic packet of the plurality of first data traffic packets for indicating a size of the first data traffic packet associated with the indicator, wherein each indicator is selected from the negotiated set, and wherein at least one first indicator of the plurality of first indicators corresponds to a first entry in the negotiated set, the first entry not being included in the default set.

33. The base transceiver station of claim 32, wherein the processor is further configured to cause the base transceiver station to decode each first data traffic packet in accordance with the first indicator associated with each first data traffic packet.

34. The base transceiver station of claim 33, wherein the processor is further configured to cause the base transceiver station to perform steps comprising:

receiving on a second reverse link a plurality of second data traffic packets from a second wireless access terminal; and receiving from the second wireless access terminal a plurality of second indicators, each second indicator of the plurality of second indicators being associated with a different second data traffic packet of the plurality of second data traffic packets for indicating a size of the associated second data traffic packet, each second indicator being selected from the default set.

35. A non-transitory machine-readable medium comprising instructions, the instructions, when executed by at least one processor of a base transceiver station of a data-optimized radio network configured to use a default set of packet sizes for data traffic on reverse links, cause the base transceiver station to perform operations comprising:

receiving from a wireless access terminal a requested set of packet sizes for data traffic on a reverse link between the base transceiver station and the wireless access terminal, the requested set being different from the default set and including at least one non-standard air interface packet size selected by the wireless access terminal to at least substantially match an application packet size utilized by an application of the wireless access terminal and thereby reduce or eliminate padding of transmitted air interface packets from the wireless access terminal;

determining a negotiated set of packet sizes for the data traffic on the reverse link, the step of determining being performed based at least in part on the requested set;

transmitting to the wireless access terminal the negotiated set;

receiving on the reverse link a plurality of data traffic packets; and receiving from the wireless access terminal a plurality of indicators, each indicator of the plurality of indicators being associated with a different data traffic packet of the plurality of data traffic packets for indicating a size of the data traffic packet associated with the indicator, wherein each indicator is selected from the negotiated set and wherein at least one indicator of the plurality of indicators corresponds to a packet size not included in the default set.

36. The method of claim 1, wherein the default set comprises a set of air interface packet sizes that are each defined in a wireless communications standard employed by the radio network.

37. The wireless access terminal of claim 11, wherein the default set comprises a set of air interface packet sizes that are each defined in a wireless communications standard employed by the radio network.

38. The machine-readable medium of claim 20, wherein the default set comprises a set of air interface packet sizes that are each defined in a wireless communications standard employed by the radio network.

39. The method of claim 25, wherein the default set comprises a set of air interface packet sizes that are each defined in a wireless communications standard employed by the radio network.

* * * * *